March 3, 1959 C. W. MONTGOMERY ET AL 2,876,076
PROCESS FOR THE MANUFACTURE OF BORON TRICHLORIDE
Filed Dec. 23, 1954 2 Sheets-Sheet 1
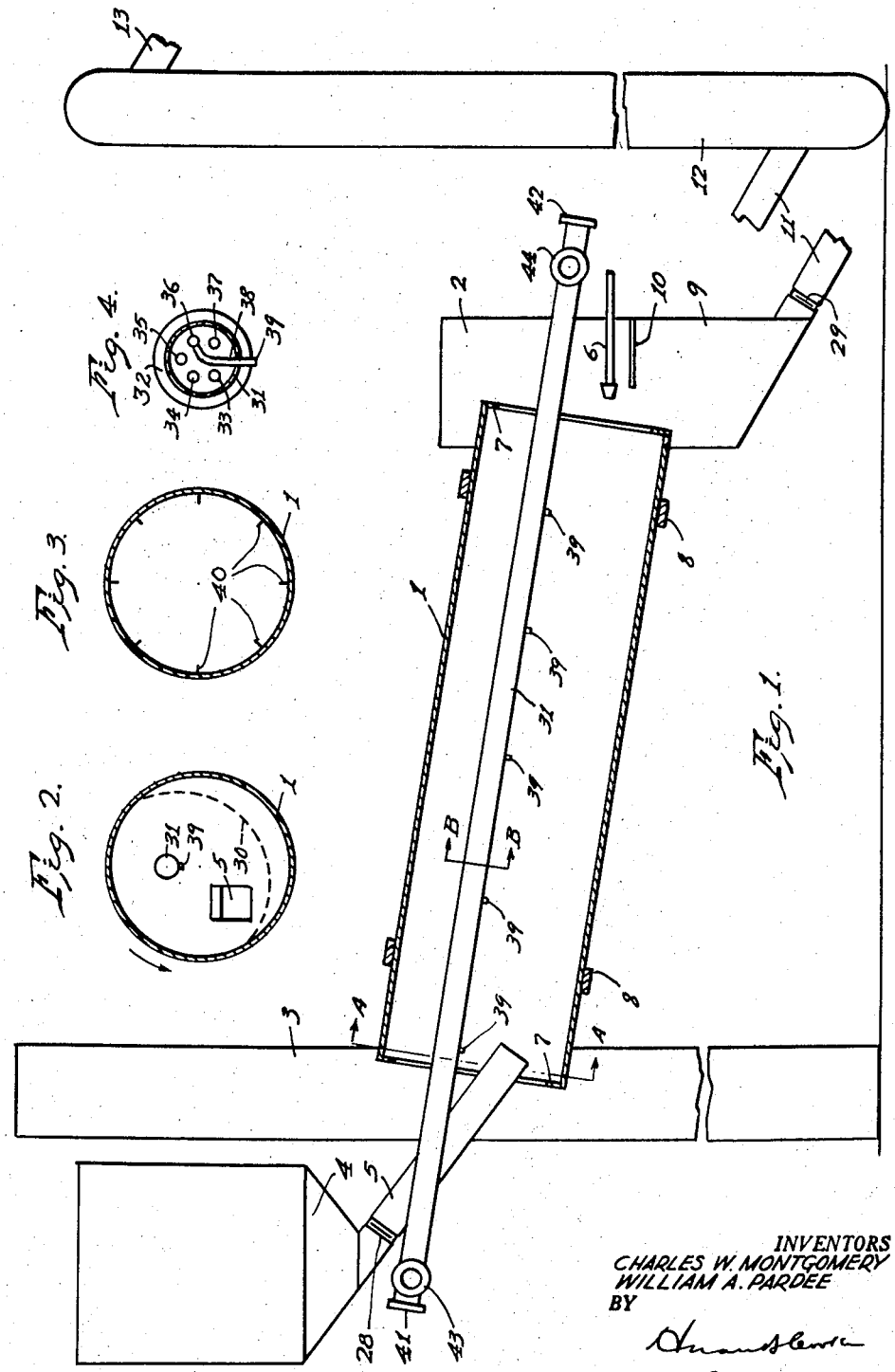
INVENTORS
CHARLES W. MONTGOMERY &
WILLIAM A. PARDEE
BY
ATTORNEYS

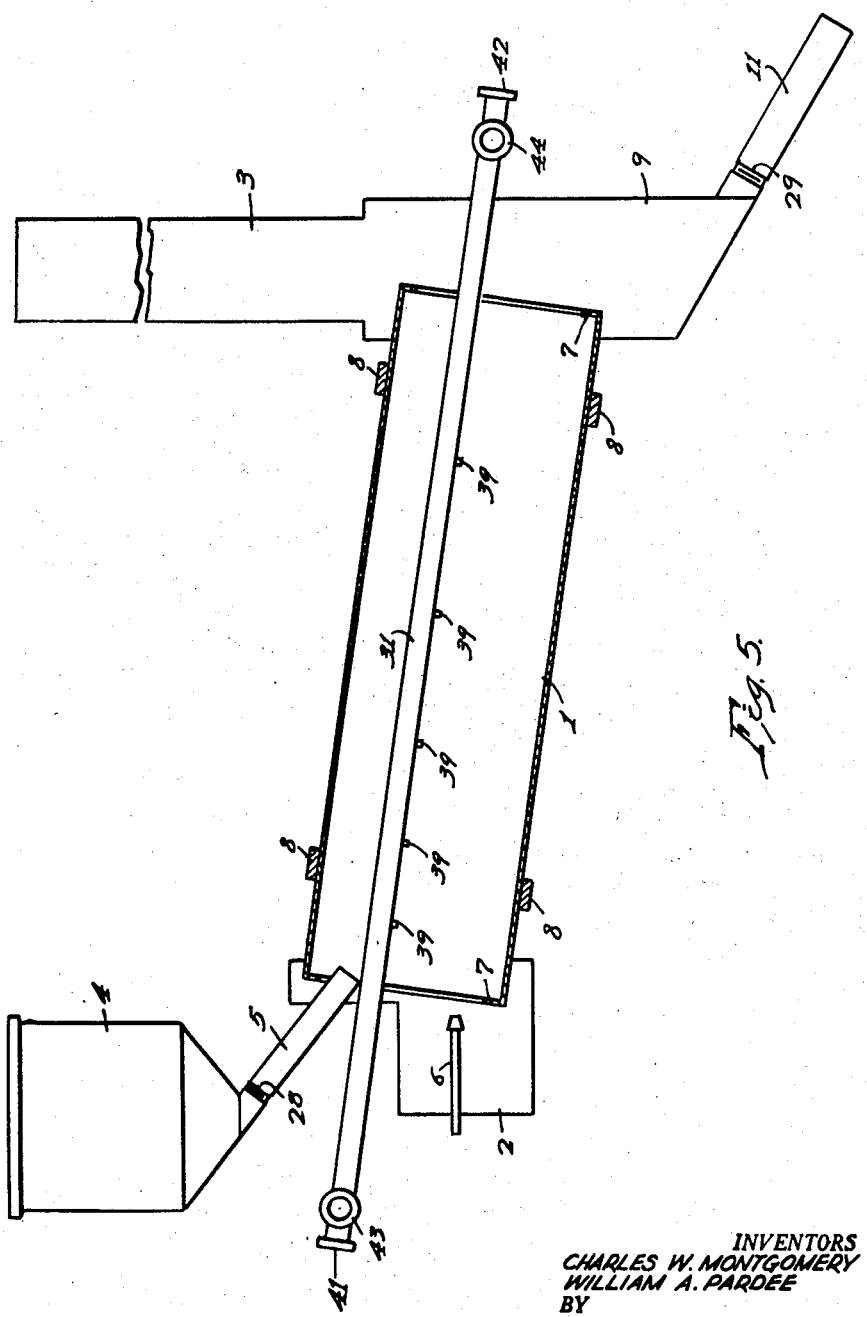

United States Patent Office 2,876,076
Patented Mar. 3, 1959

2,876,076

PROCESS FOR THE MANUFACTURE OF BORON TRICHLORIDE

Charles W. Montgomery, Oakmont, and William A. Pardee, Fox Chapel, Pa., assignors to Gulf Research & Development Company, Pittsburgh, Pa., a corporation of Delaware Application December 23, 1954, Serial No. 477,266

8 Claims. (Cl. 23—205)

This invention relates to aggregates of boron compounds and carbon and methods of preparing the same and more particularly to an aggregate of a boron compound with carbonized asphalt, the said aggregate being characterized by low density, high porosity, intimate contact of components, and high reactivity.

Boron compounds are frequently required in a form in which they are in intimate admixture and contact with carbon. This is particularly true in the case of boron compounds which are to be reduced, as in the preparation of boron trichloride.

In the processes commonly used for the reduction of boron compounds, such material and carbon are usually mixed together and subjected to heat, ordinarily in the presence of other reactants. The individual particles as commonly processed are often of a size up to and even exceeding an inch in diameter, and in some cases they are broken down to a size of the order of one hundredth of an inch or smaller. These particles are sometimes in loose admixture and sometimes are briquetted together. We have found the materials to be much more reactive, and reactive at a lower temperature, if the boron compound and the carbon are in more intimate mixture and contact such as is produced by spraying the boron compound with asphalt and then carbonizing the asphalt in intimate association with the boron compound. This is accomplished by introducing the boron compound into a heated horizontal rotary kiln and there spraying it with an asphalt which will flow at the kiln temperature, by continuing the heating of the boron compound and asphalt mixture (herein sometimes referred to as material-in-process) to a point at which the asphalt is at least partially carbonized, by adding further asphalt to the material-in-process at a number of successive points during its progress through the rotary kiln and so spacing the points of asphalt introduction as to permit substantial carbonization of each successive charge of asphalt prior to the introduction of the next charge of asphalt, the degree of carbonization between successive charges of asphalt being to a stage at which the material-in-process will not adhere to the walls of the kiln to such a degree as to prevent its further longitudinal travel therein.

Our process is particularly adapted to the preparation of an aggregate of low density from boron compounds containing chemically combined water, including specifically borax (sodium borate tetrahydrate), orthoboric acid, metaboric acid, tetraboric acid, and Colemanite. The dehydration of such a boron compound may be accompanied or succeeded by its liquefaction at the kiln temperature.

In the preparation of aggregate from boron compounds containing chemically combined water the expulsion of the water is gradual, and with the boron compound being surrounded by asphalt in all stages of its carbonization, the vapors expand with great pressure within the asphalt and develop a high degree of porosity of the resultant aggregate. This freeing and expansion of water vapors continuing throughout a large portion of the travel through the kiln, develops extensive and permanent porosity of every order of size in the resulting aggregate. The dehydrated boron compound in the final aggregate is in most intimate contact and mixture with the carbonized asphalt, having in most cases actually become fluid and penetrated into the finest pores of the matrix of carbonized asphalt at the very time those pores were in process of formation. Even sodium tetraborate, $Na_2B_4O_7$, with a melting point of 1365° F. becomes fluid at ordinary carbonizing temperature and permeates the pores of the asphalt in process of carbonization. Boric anhydride, $B_2O_3$, melts at 1070° F. which is in the lower portion of the carbonization temperature range.

The aggregate prepared in the manner described above can be discharged from the rotary kiln at any reasonable temperature desired and sufficient to carbonize the asphalt, this being controlled by the firing of the kiln. It will ordinarily be in the neighborhood of 1000° to 1600° F. The aggregate is then charged into other apparatus to be chlorinated or otherwise processed.

We proportion the charge of asphalt to that of the boron compound so as to intimately penetrate the boron compound into the pores of the carbonized asphalt in the proportion requisite for further processing, and we find that an aggregate containing such a percentage of carbon is best prepared by adding and carbonizing the asphalt in a series of increments, each individual increment proportioned to add approximately three percent to eight percent of carbon to the oxide. The total of all increments will ordinarily be such as will produce an aggregate containing at least 21 percent carbon, although this may be as low as 18 percent in the case of aggregates prepared from borax. Substantially higher percentages up to 30 percent or 35 percent are sometimes advantageous. A moderate excess of carbon is never objectionable and may even be helpful, and additional excess carbon must of course be built up in the aggregate if subsequent processing is effected in the presence of excess air which will burn off carbon. The successive increments are advantageously proportioned with the lower percentages at the cooler end of the horizontal rotary kiln and the higher percentages at the hotter end of the kiln. Also the spacing of the points at which successive increments are introduced is advantageously somewhat greater at the cooler end of the kiln than at the hotter end of the kiln because the partially cooled gases require more time, and therefore more kiln length, to accomplish the carbonization than do the hotter gases at the furnace end of the kiln.

The asphalt used in this process may vary over a wide range in characteristics but an asphalt of relatively high fixed carbon content is preferred. We have successfully used vacuum tower residuums of Baxterville (Mississippi) crude, Eastern Venezuela vis-broken petroleum pitch and other asphalts. The Baxterville residuum was an 18% residuum with 55% carbon residue and 440° F. softening point (ASTM Method D36). The Eastern Venezuela vis-broken petroleum pitch had a softening point of 350°–360° F., 55% volatile matter, and 45% fixed carbon. When using asphalts with softening points of 200° F. and above it is practical to introduce the first portion of asphalt into the kiln with the boron compound as discrete solid material.

We have invented an aggregate which is a highly reactive combination of boron compounds and carbon and a novel method of producing the same. In the manufacture of this aggregate we employ a particularly effective and efficient device for continuously preparing these aggregates, the said device being claimed in United States Patent Number 2,807,231, granted on an invention of O. L. Culberson and W. A. Pardee.

The device used in the preparation of our aggregates is shown in the accompanying drawings, and the method of preparation will subsequently be described in connection therewith.

Referring to the accompanying drawings Figure 1 is a cross section view of a rotary kiln and its related parts.

Figure 2 is a cross section view taken on A—A of Figure 1.

Figure 3 is a cross section view of the rotary kiln, showing a convenient style of longitudinal bars or "lifters" therein.

Figure 4 is a cross section view of element 31 and related parts, taken on B—B of Figure 1.

Referring to Figure 1, numeral 1 indicates a horizontal rotary kiln, extending from furnace chamber 2 at its lower end to stack 3 at its upper end. A raw material bin for material to be processed (boron compounds) is indicated by numeral 4 and a chute 5 extends from the base of bin 4 into the upper (charging) end of kiln 1. Flow of material from bin 4 to kiln 1 is controlled by gate 28. The kiln is heated by burner 6, this burner being set back in furnace chamber 2 so that its flame will not ignite asphalt introduced, as hereinafter described, at the nearest nozzle 39. The kiln 1 discharges processed material at its lower end into receiving bin 9, which is separated from furnace chamber 2 by wall 10. A chute 11 extends from the base of receiving bin 9 to the base of elevator 12, and a gate 29 is provided to control the flow of material from bin 9 to elevator 12.

A jacketed conduit 31 extends through the entire length of horizontal rotary kiln 1, with its respective ends extending through and out beyond stack 3 and furnace chamber 2. It may be supported by the walls of these members 3 and 2 or by separate supports. Conduit 31 is fitted with a series of spray nozzles 39 and it carries in its interior a number of separate smaller conduits, 34 to 37 inclusive (subsequently described in connection with Figure 4), which extend from the individual spray nozzles to headers 41 and 42. Conduit 31 is also fitted with flanges 43 and 44 adjacent its respective ends to permit the introduction and circulation of steam or some other temperature controlling fluid in conduit 31 around the exterior of the aforementioned smaller conduits.

Referring to Figure 2, this is a cross section of the rotary kiln taken on section line A—A of Figure 1. Figure 2 shows the discharge end of chute 5 and it shows jacketed conduit 31. Conduit 31 is positioned with its longitudinal axis parallel to the longitudinal axis of horizontal rotary kiln 1, and its axis will be at a point high enough to spray liquid asphalt onto the contents of the kiln from nozzle 39. The longitudinal axis of jacketed line 31 may be positioned somewhat to the side of the vertical axis of the kiln 1 in order to avoid having the material-in-process fall upon it during rotation of the kiln. Numeral 30 identifies a dotted line depicting the approximate surface of the discrete material-in-process while the kiln is rotating in a contra-clockwise direction.

Figure 3 is a cross sectional view of kln 1 showing the interior thereof fitted with a series of longitudinal ledges or "lifters" 40 to increase the agitation of material-in-process during its progress through the kiln. These have some advantages in the hotter end of the kiln.

Figure 4 is a cross section of jacketed conduit 31, taken on section line B—B of Figure 1. In this view, numeral 31 indicates the metallic conduit and 32 indicates a heavy jacket of insulating material which entirely surrounds conduit 31. Numerals 33, 34, 35, 36, and 37 indicate a series of smaller separate conduits inside of conduit 31 which lead to individual spray nozzles 39 and which terminate at their other ends at header 41 or 42, at which point they connect to individual supply lines, not shown. The number of these smaller conduits is determined by the needs of the process as hereinafter discussed. Each of the conduits of the series 33 to 37 inclusive is connected to a spray nozzle 39 through a connection 38. Figure 4 shows the manner of the connection from one of the smaller conduits to its nozzle 39.

Figure 5 is a modification of the kiln shown in Figure 1. All the numbered parts of Figure 5 correspond to those of Figure 1, and the difference between the apparatus of Figuure 1 and that of Figure 5 is that the furnace 2 and the stack 3 in Figure 5 are at ends of the kiln 1 opposite to those shown in Figure 1. In the apparatus of Figure 1 the material-in-process and the combustion gases flow countercurrent, while in the apparatus of Figure 5 the material-in-process and the combustion gases flow in the same direction.

In the practice of this invention bin 4 is loaded with a boron compound, for example, orthoboric acid of approximately half inch and less in size. There is advantage in having the material fairly fine. Kiln 1, rotated by means of gears 8, is put in operation. Burner 6 is ignited to provide the necessary heat for the operation. The boron compound from bin 4 is passed through chute 5 into horizontal rotary kiln 1. A gate 28 or star-valve or other device of similar function is positioned to control the flow of hydrate from bin 4 into kiln 1.

When the operation is well established and conditions have attained equilibrium the processed material will discharge over flange 7 of kiln 1 into bin 9 at the temperature desired, this discharge temperature being controlled by the firing. The discharge temperature is not ordinarily permitted to exceed approximately 1600° F.

Asphalt to be sprayed on the boron compound during its passage through the kiln is charged through conduits 33, 34, 35, 36 and 37, all encased in conduit 31. This conduit 31 is exposed to the high temperature gases in kiln 1 and to prevent overheating and possible coking of the asphalt in conduits 33 to 37 inclusive two separate means of protection are provided. The first is heavy fireproof insulation 32 of minimum heat conductivity. The second is a continuous flow of steam or other temperature controlling fluid through the conduit 31. Flanges 43 and 44 are provided to receive and discharge the temperature controlling fluid. This temperature controlling fluid may be introduced at either end or it may with some advantage be conducted in a closed pipe inside conduit 31 to a point part way through the length of conduit 31 and discharged therefrom to both ends 43 and 44.

When our apparatus is to be used for a purpose which will produce a large quantity of hydrocarbon vapors in the kiln we may also enclose one or more air lines (not shown) in conduit 31 and introduce secondary air at various points along the length of the kiln for the combustion of these vapors.

It is desirable to be able to positively control the amount of asphalt introduced at each point of introduction, wherefore a separate pipe of the group 33 to 37 inclusive is provided for each spray nozzle 39. The separate pipes connect to either header 41 or header 42 and are there connected to lines from asphalt pumps. A separate line from a separate pump to each individual nozzle 39 permits volumetric control of the asphalt introduced at each nozzle 39 and also serves to reduce possibility of coking a portion of a line or coking a nozzle 39 as would occur much more readily if several nozzles were served by a single line and the asphalt were free to flow out through the channel of least resistance. To minimize the heating of asphalt in conduits 33 to 37 inclusive by the hot gases in the kiln it is advantageous to extend some of these lines inward from header 41 and some from header 42 according to the relative proximity to those headers of the individual terminal nozzle 39 and the severity of the heat in the section of the kiln that the conduit must pass through.

While the accompanying drawings show five asphalt charging conduits, 33 to 37 inclusive, it is not necessary that there be that specific number. The actual number in any particular installation may be greater or in some special cases somewhat less, according to the kiln temperatures and carbonizing characteristics of the asphalt. The actual number of points of introduction of asphalt along the length of the kiln should be sufficient to permit the individual increments of asphalt to be so limited in quantity that each individual increment will be promptly absorbed into the material-in-process and rapidly coked, thereby preventing the formation of a large sticky mass that would adhere to the walls of the kiln.

The minimum amount of carbon required in an aggregate is that amount which will react with all of the combined oxygen of the ore to reduce the same. We have found that the required minimum of carbon to reduce the ore is an amount within the range of from 45 pounds of carbon up to 60 pounds of carbon per hundred pounds of oxygen in the dry ore. The amount of asphalt that must be introduced to produce a certain amount of carbon in the aggregate is susceptible of ready calculation from the fixed carbon content of the particular asphalt used. In the preparation of the aggregate in the kiln it may be necessary to use somewhat more asphlat than that required to produce the above amount of carbon, this additional amount going to provide for three other sources of carbon consumption, viz: burn-off of carbon in the kiln if excess air is present; burn-off of carbon in handling hot briquettes from kiln to subsequent processing apparatus; and burn-off in the final processing (e. g. chlorination) if air or oxygen is introduced at that stage to maintain the temperature of reaction or for other purposes. The magnitude of these three demands for carbon is determined exclusively by conditions of operation, which are within the control of the operator, and this additional carbon should be provided according to need. An additional quantity may be desirable if the subsequent processing of the aggregate is under oxidizing conditions. In a kiln which operates with the furnace gases flowing countercurrent to the material-in-process and with the gases leaving the kiln and entering the stack 3 at from 600° F. to 800° F., the maximum percentage of asphalt that can ordinarily be introduced at the stack end of the kiln is such as will add about three percent to five percent of carbon to the boron compound, measured after the asphalt is coked by the heat in the kiln. With a temperature of 1700° to 2000° F. for the furnace gases entering the kiln at the hot end, the maximum percentage of asphalt that can ordinarily be introduced from one nozzle close to that end is such as will add anywhere from about five percent to seven and one-half percent of carbon to the material-in-process. Quantities of asphalt intermediate the foregoing figures are introduced at the intermediate nozzles. The introduction of asphalt at the various nozzles in lesser quantities than those just stated is unobjectionable except that such practice may require a greater number of nozzles and even additional length of kiln. The introduction of asphalt at one point in greater quantity than can be promptly coked will produce a sticky mass that will not move longitudinally through the kiln and will seriously interfere with the operation.

In Figure 2 we have shown the conduit 31 with the nozzle 39 pointing directly downward. In some cases it may be more advantageous to rotate the conduit 31 counter-clockwise about 45°, the actual position being chosen to put the spray of asphalt on the material-in-process and to keep it away from the shell of kiln 1.

The combustion gases from the burner 6, together with distilled-off volatile matter, pass out of the upper end of the kiln into stack 3 and discharge to the atmosphere.

The material prepared in kiln 1 is finally discharged over the flange 7 at the lower end of the kiln into receiving bin 9, this bin being separated from furnace chamber 2 by means of wall 10. At this stage this material is aptly termed aggregate. From bin 9 the aggregate is conducted to other apparatus for further processing. Passage of aggregate from bin 9 to chute 11 is controlled by gate 29.

It is not ordinarily desirable to charge to the final reducing equipment or chlorinating retort any large proportion of pieces of aggregate with a maximum dimension in excess of five inches. If the aggregate discharges from kiln 1 in larger size pieces than are desired for charging to subsequent processing apparatus, a crusher can be installed in the system at a point immediately after bin 9.

The description of our process, up to this point, is directed to an operation in which the flow of the material-in-process and of the combustion gases is countercurrent. However, the process can, with equal effectiveness and advantage, be operated with the material-in-process and the combustion gases flowing in the same direction. The necessary apparatus for this type of operation is shown in Figure 5, which has already been described.

While the amount of carbon required in our aggregate to effect reduction of the ore is from 0.45 to 0.60 pound for each pound of oxygen in the ore to be reduced, it is sometimes advantageous in the case of boron compounds to use a somewhat greater proportion of carbon. The particular situation in which this is desirable is when the theoretically requisite amount (0.45 to 0.60 pound) does not provide sufficient volume of carbon matrix to form a reasonably homogeneous aggregate, leaving a substantial excess of free boron compound.

We find that the reactivity of our aggregate is enhanced somewhat in some instances by crushing it after it is discharged from the kiln and before it is subjected to further processing, e. g. chlorination. This crushing of the aggregate offsets the tendency of the boron compounds, particularly when the proportion of carbon is low, to totally enclose pieces of aggregate within a shell of fused boron compound.

Tests show that our aggregate chlorinates as well at temperatures in the range of 1300° to 1400° F. as was possible at 1800° F. when chlorinating a mechanical mixture of a boron compound and coke by previously known methods.

The following is a specific example of our aggregate and the method of producing the same.

A horizontal rotary kiln such as hereinbefore described was charged with 3000 pounds per hour of borax, $Na_2B_4O_7.10H_2O$, and through conduits 33 to 37 inclusive and nozzles 39, with 1400 pounds per hour of a 17% residue of Baxterville (Mississippi) crude oil, the 17% residue having the following tests:

| | |
|---|---|
| Solid gravity, 77° F./77° F | 1.153 |
| Softening point (ASTM D36), ° F | 441 |
| Sulfur, wt. percent | 5.53 |
| Carbon residue | 55.2 |
| Proximate analysis: | |
| Volatile matter _____percent | 50.9 |
| Fixed carbon _____do | 49 |
| Ash _____do | 0.11 |
| V _____p. p. m | 186 |
| Ni _____p. p. m | 84 |
| Cu _____p. p. m | 2 |
| Fe _____p. p. m | 375 |

The carbon content of the 1400 pounds per hour of asphalt was 686 pounds. An analysis of the finished aggregate showed the presence of 0.76 pound of carbon for each pound of oxygen. The remainder of the carbon, slightly under 3%, would be accounted for as burn-off in the kiln due to the presence therein of atmospheric oxygen in excess of that required for combustion of fuel in the furnace 2.

The aggregate was prepared in a horizontal rotary kiln having a length of sixty feet and a diameter of six feet. The borax was heated therein without asphalt in the first one foot of travel, and at one foot from the entrance it received its first spray of liquid asphalt. Four additional sprays of asphalt were charged to the material-in-process, these sprays being positioned at distances of seventeen feet, thirty-one feet, forty-three feet, and fifty-three feet from the point at which the borax entered, the last of those points being seven feet from the discharge end of the kiln. The asphalt was completely carbonized and its pores completely penetrated with sodium tetraborate. The furnace chamber temperature was maintained at 1900° F. and the gases leaving the kiln held a temperature of approximately 700° F. The residence time of the boron compound in the kiln was approximately forty-five minutes.

The aggregate prepared as described, left the kiln at a temperature of 1540° F. and was then chlorinated at a temperautre of 1400° F. Dry chlorine gas at atmospheric temperature was charged to the retort and the chlorination proceeded smoothly and at a very satisfactory rate. Boron trichloride generated in the chlorinating retort was condensed and separately recovered. The aggregate of our invention chlorinated smoothly at a temperature of 1400° F. despite the fact that chlorination of mechanical mixtures of the boron compound and carbon has always required minimum temperatures of 1600° to 1800° F. The same high temperatures of 1600° to 1800° F. have always been required to chlorinate briquettes of finely ground boro compound and carbon. In the preparation of our aggregate the asphalt does fortunately serve as a binder but that is incidental.

The following is a second specific example of our aggregate and the method of producing the same.

A horizontal rotary kiln such as hereinbefore described was charged with 3000 pounds per hour of orthoboric acid, $H_3BO_3$, and through conduits 33 to 37 inclusive and nozzles 39 with 1532 pounds per hour of a 17% residue of Baxterville crude oil, this residue being the same as described in full in the immediately preceding specific example and having a fixed carbon content of 49%. The mode of preparation of the aggregate was in all respects similar to that of the immediately preceding specific example.

The carbon content of the 1532 pounds per hour of the described asphalt was 751 pounds. An analysis of the finished aggregate showed the presence of 0.63 pound of carbon for each of the 1165 pounds of oxygen in the 1690 pounds of $B_2O_3$ resulting from the dehydration of the orthoboric acid. The remainder of the carbon, approximately 2½%, would be accounted for as burn-off in the kiln due to the presence therein of atmospheric oxygen in excess of that required for combustion of fuel in furnace 2.

The asphalt of the aggregate was completely carbonized and its pores well permeated by $B_2O_3$. The furnace chamber temperature was maintained at 1900° F. and the gases leaving the kiln held a temperature of approximately 700° F.

The aggregate prepared as described, left the kiln at a temperature of 1540° F. and was then chlorinated at a temperature of 1400° F. Dry chlorine gas at atmospheric temperature was charged to the retort and the chlorination proceeded smoothly and at a very satisfactory rate. Boron trichloride generated in the chlorinating retort was condensed and separately recovered. The aggregate of our invention chlorinated smoothly at a temperature of 1400° F. despite the fact that chlorination of mechanical mixtures of the boron compound and carbon has always required minimum temperatures of 1600° to 1800° F.

Primarily the outstanding facts of the aggregate which we have invented are that by using petroleum asphalt and handling it in the specific manner herein described and claimed we get a carbonized product of remarkably high porosity and simultaneously with the generation of this high porosity we fill much of the pore volume with a boron compound, thereby forming a novel and extraordinarily reactive aggregate for further processing. When the boron compound is one containing chemically combined water, the gradual expulsion of water therefrom throughout the carbonization of the asphalt results in an aggregate of extraordinary porosity and of extremely low density which is also characterized by all of the other previously described characteristics of the aggregates of our invention. Aggregates prepared from boron compounds containing chemically combined water have had weights of even less than twenty grams per hundred cubic centimeters when determined with granular material passing through a twenty mesh per inch screen and not passing through a thirty mesh per inch screen.

When chlorinating borates of sodium or of calcium it is possible to selectively chlorinate the boron content of the ore by operating at a temperature within the approximate range of 1000° to 1200° F. Within this range the chlorination of the sodium and calcium content of the ore is much less rapid than that of the boron content. In batch chlorination it is possible to cut off the chlorine supply at a point when most of the sodium and calcium will be unreacted. This same selective chlorination can be conducted in continuous manner if means are provided in the chlorination retort for continuous removal of the partially chlorinated ore.

In this specification and the accompanying claims the term "horizontal rotary kiln" is used to designate the type of kiln commonly known by that designation, notwithstanding that such kilns are in fact inclined kilns having the charging end elevated somewhat above the discharge end.

We claim:

1. In the manufacture of boron trichloride, the process which comprises: charging a boron compound containing chemically combined water to a heated horizontal rotary kiln; rotating the kiln and thereby tumbling the charged material and causing it to travel longitudinally through the said kiln; applying a small percentage of liquefied petroleum asphalt to the charged boron compound at a point near the charging end of the said kiln; maintaining the temperature in the said kiln within a range that will dehydrate the said boron compound and carbonize the applied asphalt; at least partially carbonizing the applied small percentage of asphalt; successively applying and carbonizing additional small percentages of asphalt with the said boron compound during its longitudinal passage through the said kiln; discharging from the kiln an aggregate of fully carbonized asphalt and dehydrated boron compound; chlorinating the said aggregate; and finally condensing and so separately obtaining boron trichloride.

2. In the manufacture of boron trichloride, the process which comprises: charging a boron compound containing chemically combined water to a heated horizontal rotary kiln; rotating the kiln and thereby tumbling the charged material and causing it to travel longitudinally through the said kiln; applying a small percentage of liquefied petroleum asphalt to the charged boron compound at a point near the charging end of the said kiln; maintaining the temperature in the said kiln within a range that will dehydrate the said boron compound and carbonize the applied asphalt; at least partially carbonizing the applied small percentage of asphalt; successively applying and carbonizing additional small percentages of asphalt with the said boron compound during its longitudinal passage through the said kiln; discharging from the kiln an aggregate of fully carbonized asphalt permeated with dehydrated boron compound; chlorinating the said aggregate; and finally condensing and so separately obtaining boron trichloride.

3. In the manufacture of boron trichloride, the process which comprises: charging an oxygen-containing boron compound containing chemically combined water to a heated horizontally rotary kiln; rotating the kiln and thereby tumbling the charged material and causing it to travel longitudinally through the said kiln; applying a small percentage of liquefied petroleum asphalt to the charged boron compound at a point near the charging end of the said kiln; maintaining the temperature in the said kiln within a range that will dehydrate the said boron compound and carbonize the applied asphalt; at least partially carbonizing the applied small percentage of asphalt; successively applying and carbonizing additional small percentages of asphalt with the said boron compound during its longitudinal passage through the said kiln until the weight of the carbonized asphalt is at least 0.45 pound per pound of oxygen in the dehydrated boron compound; discharging from the kiln an aggregate of fully carbonized asphalt permeated with dehydrated boron compound; chlorinating the said aggregate; and finally condensing and so separately obtaining boron trichloride.

4. In the manufacture of boron trichloride, the process which comprises: charging an oxygen-containing boron compound containing chemically combined water to a heated horizontally rotary kiln; rotating the kiln and thereby tumbling the charged material and causing it to travel longitudinally through the said kiln; applying a small percentage of liquefied asphalt to the charged boron compound at a point near the charging end of the said kiln; maintaining the temperature in the said kiln within a range that will carbonize the applied asphalt and dehydrate the boron compound; at least partially carbonizing the applied small percentage of asphalt; successively applying and carbonizing additional small percentages of asphalt with the said boron compound during its longitudinal passage through the said kiln until the weight of the carbonized asphalt is at least 0.45 pound per pound of oxygen in the dehydrated boron compound; limiting the said small percentages of asphalt to such quantity as can be carbonized with the boron compound without forming an adhesive mass that adheres to the kiln wall; chlorinating the said aggregate; and finally condensing and so separately obtaining boron trichloride.

5. In the manufacture of boron trichloride, the process which comprises: charging a boron compound containing chemically combined water to a heated horizontal rotary kiln; rotating the kiln and thereby tumbling the charged material and causing it to travel longitudinally through the said kiln; applying a small percentage of liquefied petroleum asphalt to the charged boron compound at a point near the charging end of the said kiln; maintaining the temperature in the said kiln within a range that will carbonize the applied asphalt and dehydrate the boron compound, while not heating the material-in-process above 1600° F.; carbonizing the applied small percentage of asphalt; successively applying and carbonizing additional small percentages of asphalt with the said boron compound during its longitudinal passage through the said kiln; discharging from the kiln a fully carbonized aggregate of asphalt and dehydrated boron compound; chlorinating the said aggregate; and finally condensing and so separately obtaining boron trichloride.

6. In the manufacture of boron trichloride, the process which comprises: charging a boric acid to a heated horizontal rotary kiln; rotating the kiln and thereby tumbling the charged material and causing it to travel longitudinally through the said kiln; applying a small percentage of liquefied petroleum asphalt to the charged boric acid at a point near the charging end of the said kiln; maintaining the temperature in the said kiln within a range that will carbonize the applied asphalt and dehydrate the boric acid; at least partially carbonizing the applied small percentage of asphalt; successively applying and carbonizing additional small percentages of asphalt with the said boric acid during its longitudinal passage through the said kiln until the weight of the carbonized asphalt is at least 0.45 pound per pound of oxygen in the dehydrated boric acid; discharging from the kiln an aggregate of fully carbonized asphalt and boric anhydride; chlorinating the said aggregate; and finally condensing and so separately obtaining boron trichloride.

7. In the manufacture of boron trichloride, the process of claim 1 in which the boron compound charged to the kiln is borax.

8. In the manufacture of boron trichloride, the process of claim 1 in which the boron compound charged to the kiln is boric acid.

References Cited in the file of this patent
UNITED STATES PATENTS

| | | |
|---|---|---|
| 1,957,129 | Bartling et al. | May 1, 1934 |
| 2,097,482 | Weber | Nov. 2, 1937 |
| 2,184,885 | Muskat et al. | Dec. 26, 1939 |
| 2,369,212 | Cooper | Feb. 13, 1945 |
| 2,401,544 | Brallier | June 4, 1946 |
| 2,479,904 | Cole | Aug. 23, 1949 |